(12) United States Patent
Mosier et al.

(10) Patent No.: US 8,049,870 B2
(45) Date of Patent: Nov. 1, 2011

(54) SEMI-ACTIVE OPTICAL TRACKING SYSTEM

(75) Inventors: Daniel J. Mosier, Tucson, AZ (US);
Dwight L. Denney, Tucson, AZ (US);
John Yoon, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 181 days.

(21) Appl. No.: 12/437,855

(22) Filed: May 8, 2009

(65) Prior Publication Data
US 2010/0283988 A1 Nov. 11, 2010

(51) Int. Cl.
*G01P 3/36* (2006.01)
*G01B 11/26* (2006.01)
(52) U.S. Cl. .................................. 356/29; 356/139.04
(58) Field of Classification Search ............. 356/4.01, 356/139.04, 139.05, 139.08, 29
See application file for complete search history.

(56) References Cited

U.S. PATENT DOCUMENTS

| | | | |
|---|---|---|---|
| 6,265,704 B1 * | 7/2001 | Livingston | 250/203.2 |
| 6,849,841 B2 * | 2/2005 | Byren et al. | 250/201.9 |
| 7,041,953 B2 * | 5/2006 | Byren | 250/201.9 |
| 7,477,368 B2 * | 1/2009 | Guthrie | 356/139.08 |

* cited by examiner

*Primary Examiner* — Isam Alsomiri
(74) *Attorney, Agent, or Firm* — Renner, Otto, Boisselle & Sklar, LLP (57) ABSTRACT

A system and method for tracking an airborne target including an illumination source (e.g., a diode laser array) is used to enhance a target signature and a detector (e.g., a passive high-speed camera) is used to detect to electromagnetic radiation (e.g., infrared radiation) reflected off the target. The received electromagnetic radiation may be processed by a digital computer and passed through a spatial filter that implements a band limited edge detection operation in the frequency domain. The filter may remove low spatial frequencies that attenuate soft edged clutter such as clouds and smoke as well as filter out artifacts and attenuated medium to high spatial frequencies to inhibit speckle noise from the detector as well as speckle from the laser return off the target.

37 Claims, 11 Drawing Sheets

SEMI-ACTIVE OPTICAL TRACKING SYSTEM

TECHNICAL FIELD

The present invention relates generally to systems and methods for tracking targets using electromagnetic radiation.

BACKGROUND OF THE INVENTION

Directed energy weapons and specifically high-energy laser (HEL) weapons are being considered for variety of military applications with respect to a variety of platforms, e.g., spaceborne, airborne and land based systems to name a few. These weapons generally involve the use of a laser or other source of a high-power beam of electromagnetic radiation to track and destroy a target. To achieve mission objectives, directed energy weapons must accurately track the intended target. Accurate tracking of airborne targets is extremely difficult given the presence of clutter (e.g., terrain, clouds, smoke, etc.) and sensor noise. The HEL beam further complicates the situation by generating hot-spots on the target and incandescing the debris, which can "walk" the HEL beam off the intended target.

SUMMARY OF THE INVENTION

Aspects of the present invention relate to a system and method for tracking a target, wherein an illumination source is used to enhance a target signature and a detector (e.g., a passive high-speed camera) is used to detect the electromagnetic radiation reflected off the target. The received electromagnetic radiation may be processed by a digital computer or processor and passed through a spatial filter that implements a band limited edge detection operation in the frequency domain on acquired images. The filter may remove low spatial frequencies that attenuate soft edged clutter such as clouds and smoke as well as filter out sensor artifacts and attenuate medium to high spatial frequencies to inhibit speckle noise from the detector as well as speckle from the laser return off the target.

Edge enhancement may be performed using a multi-frame correlation and/or registration process. An image may be binarized and objects may be detected and associated with existing tracks and/or new tracks are generated depending on calculated attributes of the detected electromagnetic radiation. For the unmanned aerial vehicle (UAV) or missile target, a correlation with a library of reference of silhouettes may be used to detect the attitude of the target. Knowledge of the target attitude enables precise endpoint placement in spite of target maneuvering.

Prior art tracking systems include all passive visible and infrared sensors, as well as, active illuminated systems. One problem with such sensors is that passive systems have difficulty acquiring a target in cluttered environments and active systems rely on range-gated sensors and fast switching illuminators, which are expensive. The prior art tracking systems utilize a variety of tracking methods to track an intended target. Many of these tracking methods suffer from a problem of "random walk", where the heat from the HEL walks the tracker to the edge of the target or completely off the target.

One aspect of the invention relates to a tracking system for use with a high energy laser, the system including: an illuminator for generating electromagnetic radiation to be directed at an airborne target; a track telescope having a track detector configured to receive electromagnetic radiation reflected from the airborne target; a processor coupled to the track detector and a steering controller of a high energy laser (HEL), wherein the processor processes target information based at least in part on the received electromagnetic radiation detected from the track detector by applying a band-limited edge detection operation to the target information and generates band-limited edge detection data used to identify edges of the airborne target in order to track the airborne object.

Another aspect of the invention relates to a method for tracking an airborne target, the method including: generating electromagnetic radiation to be directed at an airborne target; receiving electromagnetic radiation reflected from the airborne target with a track detector; processing the received electromagnetic radiation to generate a control signal to control a steering controller used to direct a high energy laser (HEL), wherein the received electromagnetic radiation detected is processed by applying a band-limited edge detection operation to target information based at least in part on the received electromagnetic radiation to generate band-limited edge detection data used to identify edges of the airborne target in order to track the airborne object.

Another aspect of the invention relates to a method for tracking an airborne target, the method including: generating electromagnetic radiation to be directed at an airborne target; receiving electromagnetic radiation reflected from the airborne target with a track detector; processing the received electromagnetic radiation to generate a control signal to control a steering controller used to direct a high energy laser (HEL), wherein the received electromagnetic radiation detected is processed by applying a band-limited edge detection operation to target information based at least in part on the received electromagnetic radiation to generate band-limited edge detection data used to identify edges of the airborne target; processing one or more reference images stored in a storage element coupled to the processor by applying a band-limited edge detection operation to the one or more reference images; determining an offset value for aiming a high energy laser (HEL) based on the offset value; and providing the offset value to a steering controller coupled to the processor for steering the HEL.

Another aspect of the invention relates to a high energy laser (HEL) tracking system including: an illuminator for generating electromagnetic radiation to be directed at an airborne target; a track telescope having a track detector configured to receive electromagnetic radiation reflected from the airborne target, wherein the track detector is configured to detect the electromagnetic radiation reflected from the airborne target; a track source selector for selecting a type of airborne target to track, wherein the selector is operable in a first setting to when the airborne target is a mortar or artillery shell and operative in a second setting when the airborne target is an unmanned aerial vehicle (UAV) or missile; a processor coupled to the track detector and a steering controller of a high energy laser (HEL), wherein the processor process target based at least in part on the received electromagnetic radiation detected from the track detector by applying a band-limited edge detection operation to the target information and generates band-limited edge detection data used to identify edges of the airborne target in order to track the mortar shell or the UAV.

The foregoing and other features of the invention are hereinafter more fully described and particularly pointed out in the claims, the following description and the annexed drawings setting forth in detail illustrative embodiments of the invention, such being indicative, however, of but a few of the various ways in which the principles of the invention may be employed.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF THE INVENTION

The present disclosure relates to a tracking system and method for tracking airborne targets. The system generally includes an illuminator for generating electromagnetic radiation to be directed at an airborne target. The illuminator may be in the form of at least one of a solid-state laser, a fiber laser, or a laser diode array. The illuminator generally produces electromagnetic in the form of an output beam having a wavelength between visible (380 to 750 nanometers) and infrared (400 to 700 nanometers) regions of the electromagnetic spectrum. The output beam of the illuminator is directed to a target through a free-space coupled or a fiber-coupled delivery.

The system further includes a track telescope having a track detector configured to receive electromagnetic radiation reflected from the airborne target.

A processor is coupled to the track detector and a steering controller for a high energy laser (HEL) to generate a control signal for input to the steering controller in order to steer the HEL based at least in part on the received electromagnetic radiation. The processor processes target information based at least in part on the received electromagnetic radiation detected from the track detector by applying a band-limited edge detection operation to the target information and generates band-limited edge detection data used to identify edges of the airborne target in order to track the airborne object.

In one embodiment, the disclosed tracking system uses a near infrared (808 nm) laser diode array to enhance target signature and a passive high-speed camera to image the target. Image data is processed into a processor or digital computer and passed through a spatial filter that implements a band-limited edge detection algorithm in the frequency domain. The filter removes low spatial frequencies that attenuate soft-edged clutter such as, for example, clouds and smoke as well as optical shading artifacts. The filter also attenuates medium to high spatial frequencies to inhibit speckle noise from the detector as well as speckle from the laser return off the target. Edge enhancement is performed using a multi-frame correlation and/or registration process. The image may be binarized and objects are detected and associated with existing tracks or new tracks may be generated if the track fails to match an existing track. For the unmanned aerial vehicle (UAV) or missile, a correlation with a library of reference silhouettes is used to detect the attitude of the target. Knowledge of the target attitude enables precision aimpoint placement in spite of target maneuvering.

Figure 1:
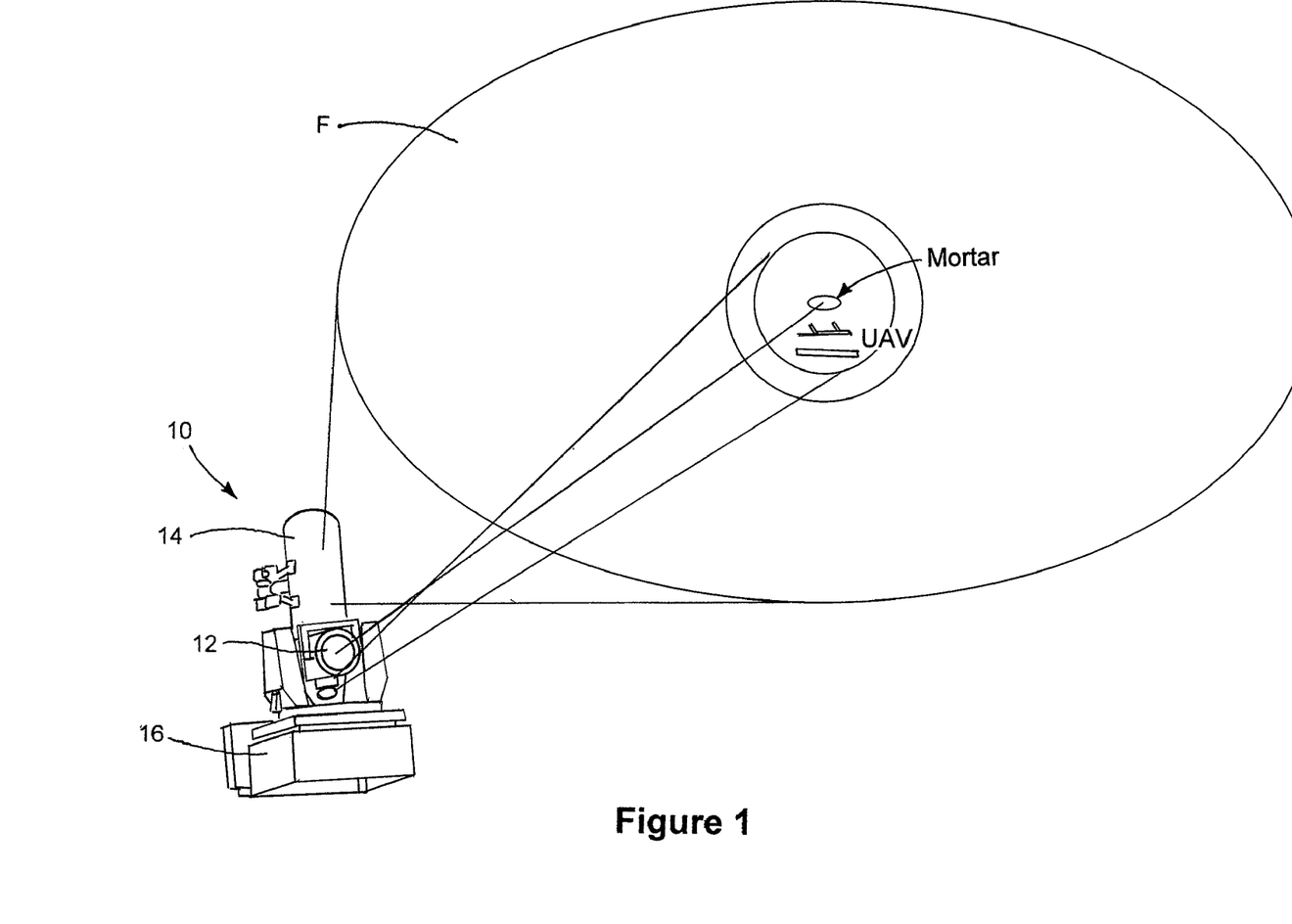
FIG. 1 is schematic block diagram of an exemplary weapon system in accordance aspects of the present invention.

A simplified schematic of a High Energy Laser (HEL) weapon system 10 is illustrated in FIG. 1. The HEL weapon system 10 includes a beam director subsystem 12, a radar 14 that detects objects (e.g., mortar shells, Unmanned aerial vehicles (UAVs), etc.) in a field (F), and a base 16 that may be secured to a stationary (e.g., a fixed location on a military base) and/or moving platform (e.g., a tank, ship, etc.) to secure the weapon system.

Figure 2:
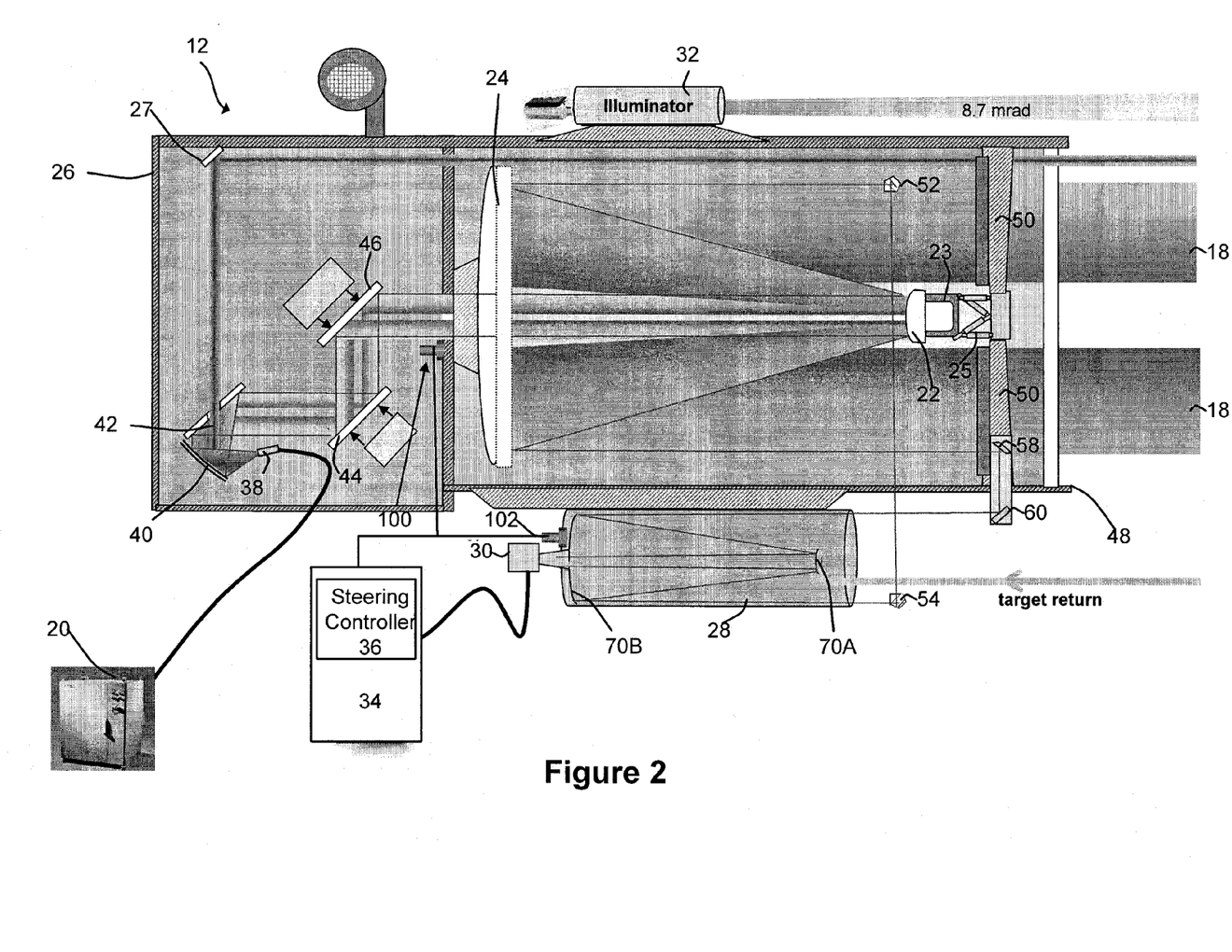
FIG. 2 is schematic block diagram of a beam director subsystem in accordance aspects of the present invention.

Referring to FIG. 2, the beam director subsystem 12 generates a HEL beam 18 for use in incapacitating an intended target and/or otherwise destroying an intended target. The beam director subsystem 12 includes HEL beam system and a tracking system. The HEL beam director subsystem 12 provides the guidance and control of the HEL for the weapon system.

The beam director subsystem 12 includes a source of electromagnetic radiation 20 for generating a high energy laser (HEL) beam. A secondary mirror 22 receives the electromagnetic radiation and reflects the electromagnetic radiation to a primary mirror 24 for output of the HEL beam through the housing 26. The secondary mirror 22 is curved and expands the electromagnetic radiation received from the source prior to outputting the HEL beam from the primary mirror 24. The secondary mirror 22 and/or the primary mirror 24 may be manufactured from aluminum or any other material that is capable of withstanding the thermal and performance demands of the present invention.

The secondary mirror 22 may be secured by a bracket 23 to one or more linear actuators 25. The linear actuators 25 have an adjustable length that may be controlled to automatically change the distance between the primary mirror 24 and the second mirror 22, which changes the focal point of the HEL beam. The linear actuators may be secured to the housing and/or strut diverters 50, as illustrated in FIG. 2. In one embodiment, there may be three pairs of linear actuators 25 secured to the bracket 23 to allow adjustment of the secondary mirror 22.

The beam director subsystem 12 includes a track telescope 28 coupled to the housing 26. The track telescope 28 has a track detector 30 configured to receive a first portion and a second portion of the electromagnetic radiation of the HEL beam, as discussed below. The track telescope 28 and the track detector 30 are also configured to receive electromagnetic emitted by an illuminator 32 and reflected off an intended target. A processor 34 is coupled to the track detector 30 and a steering controller 36 to control the HEL beam. As described more fully below, the processor 34 processes the first and second portions of the HEL beam along with the electromagnetic radiation reflected from the intended target to steer the HEL at the intended target.

The HEL beam 18 may be any type of high energy laser that is capable of radiating electromagnetic radiation in a form to destroy and/or disable one or more intended airborne targets. The HEL 18 includes a source of high energy electromagnetic radiation 20. The source of high energy electromagnetic radiation 20 may be any type of electromagnetic radiation that may be used to destroy and/or disable an airborne target. The electromagnetic radiation may be output at any power and frequency that is operable to reduce and/or eliminate the threat of the airborne target. For example, the electromagnetic radiation may have a power of 50 kW at 1070 nanometers. The high-power electromagnetic radiation may be output from a fiber coupling 38 to a mirror 40. The mirror 40 may reflect the electromagnetic radiation to an annular mirror 42. Multiple electromagnetic radiation pathways will now be described.

Figure 3:
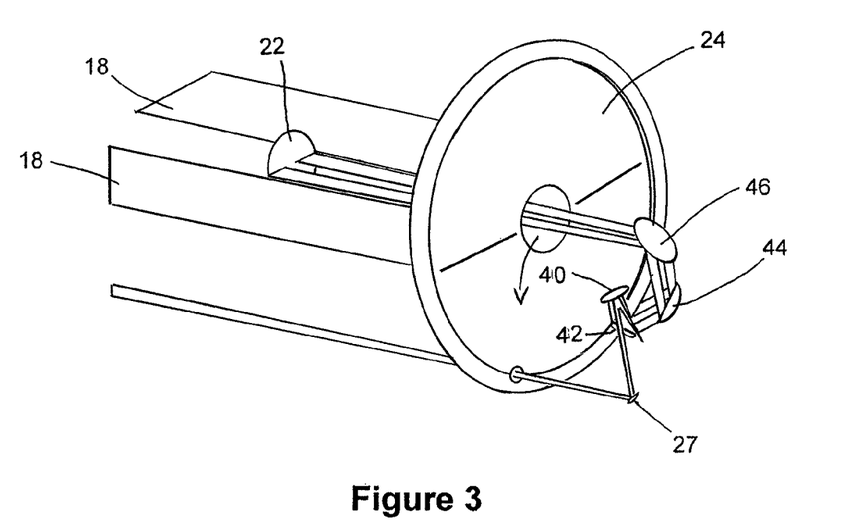
FIG. 3 is a schematic diagram of electromagnetic radiation paths of the beam director subsystem of FIG. 2.

One path of electromagnetic radiation reflects off the annular mirror 42 to the fast steering mirror 44. The electromagnetic radiation then reflects off fast steering mirror 44 to the beam-walk corrector mirror 46. Referring to FIGS. 2 and 3, the electromagnetic radiation reflects off the beam-walk corrector mirror 46 through a void (V) formed in the center of primary mirror 24, reflects off secondary mirror 22, which distributes the electromagnetic radiation along the primary mirror 24 for output through an open end 48 the housing 26. The output of the HEL beam 18 may also pass through strut diverters 50.

In another path of electromagnetic radiation, the annular mirror 42 removes the core of the beam (e.g., the central portion of the reflected beam) and bypasses the primary mirror 24 so that the HEL energy is not reflected through the system 12 off the secondary mirror 20, as shown in FIGS. 2 and 3, which creates a stray-light hazard with the structure. In order to reduce heat, the electromagnetic radiation from the core of the beam is reflected off mirror 27 and directed out front end 48 of the housing 26. The stray illumination is generally unfocused and does not contribute to the destruction or disablement of the target.

The beam director subsystem 12 includes the following controls for stray light management and thermal management: all-reflective fiber output coupler mirrors (not lenses), which manage high heat load better than lenses; the secondary mirror is a stop of optical system; radiation past edges exits front end 48 of housing 26 at a maximum angle less than 40 degrees; reflections off secondary obstruction avoided by adding a hole in fold Mirror and reflecting stray light out of front end 48; reflector is positioned outside of primary HEL signal path, mirrored support tube, and V-groove strut guards 50 spread and manage stray light to be eye safe at a predetermined distance, and reduces heating of secondary mounting structure (e.g., structures 23, 25) for securing the secondary mirror 22 to the housing 26.

Another path of electromagnetic radiation includes a reflecting surface 52 (e.g., a pentaprism) that routes a first portion of the electromagnetic radiation of the HEL beam 18 through the track telescope 28 to the track detector 30. The first portion of the electromagnetic radiation is illustrated as being output from the upper portion of the primary mirror 24. Between the reflecting surface 52 and the track detector 28 may be another reflecting surface 54 (e.g., a pentaprism) to direct the first portion of the electromagnetic radiation of the HEL beam through the track telescope 28 to the track detector 30. A pentaprism gives a perfect 90 degree rotation of the beam. The beam entering is output at 90 degrees relative to the incoming beam. The reflecting surfaces 54, 56 are generally not affect rotations in plane. The output beam is not affected by rotation in plane. Thus, the reflecting surfaces 54, 56 provide precision reference in one direction.

In yet another electromagnetic radiation path, a reflecting surface 58 (e.g., a later transfer hollow retroreflector, corner reflector, etc.) routes a second portion of the electromagnetic radiation of the HEL beam 18 through the track telescope 28 to the track detector 30. The second portion of the electromagnetic radiation is illustrated as being output from the lower portion of the primary mirror 24. Between the reflecting surface 58 and the track detector 30 may be another reflecting surface 60 (e.g., a lateral transfer hollow retroreflector, corner reflector, etc.) to direct the second portion of the electromagnetic radiation of the HEL beam 18 through the track telescope 28 to the track detector 30. A lateral transfer hollow retroreflector gives a precise measure in two axes and parallelism is not affected by yaw and clocking rotations. Coupling of the reflecting surfaces 54, 56 and 58, 60 to detection by the track detector 30 provides unambiguous indication of beam focus and tilt error between the two telescopes (e.g. housing 26 and track telescope 28).

Referring to FIG. 2, the beam director subsystem 12 further includes an illuminator 32 for generating electromagnetic radiation to be directed at the associated target. The illuminator 32 may be any type of a device that is capable of directing electromagnetic radiation to an intended airborne target. For example, the illuminator 32 may be a solid-state laser, a fiber laser or a laser diode array. The illuminator generally produces an output beam directed to a target through either free-space coupled or fiber-coupled deliver. The output beam may be emitted in an electromagnetic spectrum range between visible and infrared modalities.

The illuminator may output electromagnetic radiation at any desired frequency in the electromagnetic spectrum. In one embodiment, the illuminator 32 is a laser diode array. The laser diode array may produce electromagnetic radiation in the infrared region of the electromagnetic spectrum. For example, the laser diode array may a beam of electromagnetic radiation having output power of 100 Watts at a wavelength of 808 nanometers.

The beam director subsystem 12 further includes a track telescope 28. The track telescope 14 includes one or more components 70A, 70B to direct electromagnetic radiation reflected from the intended airborne target and the first and second portions of electromagnetic radiation received from the HEL beam to the track detector 30. The track telescope 28 generally gathers the reflected electromagnetic radiation and may also magnify the target and/or portions of the HEL beam. The exemplary components 70A, 70B may vary based upon the type of electromagnetic radiation being detected and/or telescope type, for example. The components 70A, 70B may include a lens and/or mirror that gathers light (or other electromagnetic radiation) and concentrates it so the image can be examined and/or further processed.

The track detector 30 may be any detector that is capable of capturing the electromagnetic radiation reflected from the target and receive the first and/or second portions of electromagnetic radiation from the HEL beam 18. Generally, the track detector 30 has an array of pixels that may be used to calculate and/or characterize error, alignment, etc. The detector 30 may vary based on the electromagnetic spectrum employed by the illuminator 32 and/or the HEL beam 18. In one embodiment, the detector 30 may be a camera that is capable of detecting electromagnetic radiation from the visible and/or infrared electromagnetic spectrum. The electromagnetic radiation detected by the detector 30 may be in the form of one or two dimensional images, for example.

The detector 30 is configured to receive electromagnetic radiation emitted from the illuminator 62 and reflected from the airborne target. In addition, the detector also receives electromagnetic radiation emitted from the HEL beam 18 through the primary mirror 24 and reflected to the detector through reflecting surfaces 52, 54 and 58, 60, as discussed above. The detector 30 maintains knowledge of the alignment of the track telescope beam (e.g., the illuminator) and the HEL beam by measuring and processing incident light received with processor 34.

The processor 34 may be any type of computer that is capable of controlling and processing data and electromagnetic radiation as described herein. The processor 34 may also include a steering controller 36 that couples the detector 30 and processor 34 to one more devices (e.g., gyroscope 80, 82) for steering and/or aligning the HEL beam 18.

Although not shown for purposes of clarity, one of ordinary skill in the art will readily appreciate that the one or more beam splitters and/or absorptive baffles may also be incorporated at or near various optical and/or reflective components of the beam director subsystem 12 in order to dissipate energy spilled over the edge of the reflective components. For example, one or more beam splitters may be placed in the optical path between the reflecting elements 52, 54 and 58, 60 so that a desired signal for the HEL beam is routed to the detector.

Figure 4:
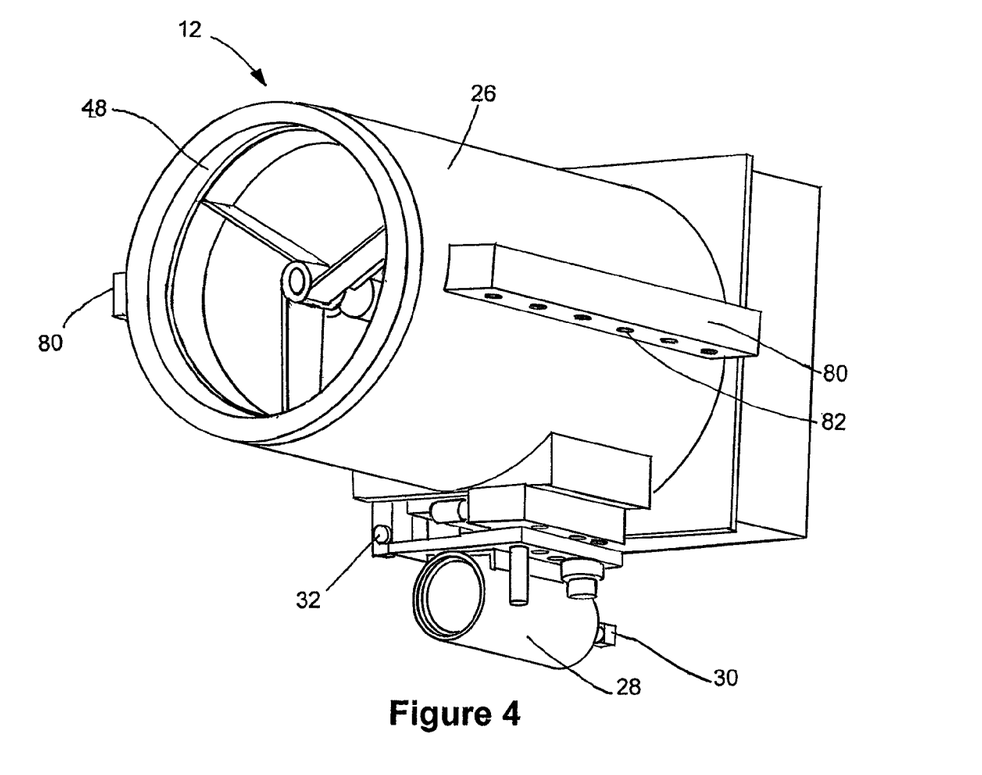
FIG. 4 is an exemplary housing for the beam director subsystem of FIG. 2.
Figure 5:
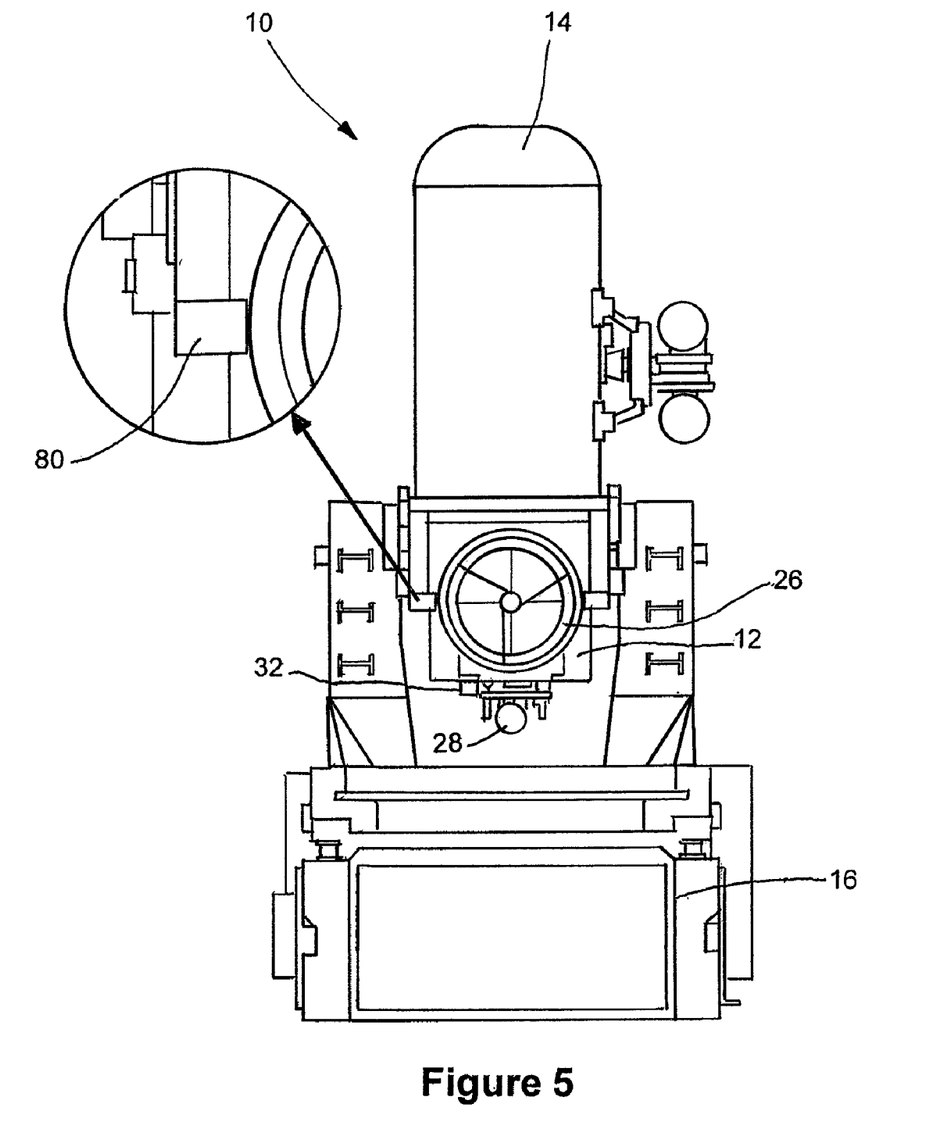
FIG. 5 is schematic block diagram of the exemplary weapon system in accordance aspects of the present invention.

Referring to FIGS. 4 and 5, the beam director subsystem 12 may be secured to a weapons system 10. The housing 26 of the beam director subsystem 12 may be formed of a highly rigid material (e.g., aluminum, titanium, etc.). The housing 26 generally includes one or more attachment members 80, as shown in FIG. 3. The attachment members 80 may be flanges that extend on opposite sides of the housing 12. The attachment members 80 engage the weapon systems and are secured by one or more securing members through one or more holes 82 formed in the attachment members 70. Exemplary securing members may include bolts, screws, rivets, etc.). Generally any securing member that allows the beam director subsystem to be installed and/or removed from weapons system 14 is deemed to fall within the scope of the present invention.

The gyroscope triads 100, 102 (FIG. 2) are the primary instruments for maintaining sensor to laser bore sight alignment. In general, the processor 34 processes the electromagnetic radiation received at the detector 30 and outputs a corresponding signal to steering controller 36, which controls operation of the gyroscopes 100, 102. The gyroscope 100 is coupled to the housing 26 and is used to control alignment of the HEL beam 18. The gyroscope 102 is mounted to the track telescope and is used to control the track telescope 28. The gyroscopes 100, 102 are debiased by on-line drift estimation using measurements available from the weapon system (such azimuth measurements and elevation alignment measurements), and optical feedback from the retroflectors 58, 60 and processing through Kalman filter, as discussed below.

The signals received by the detector 30 may be processed by one or more algorithms to determine alignment differences between the track telescope 28 and the HEL beam 18.

Figure 6:
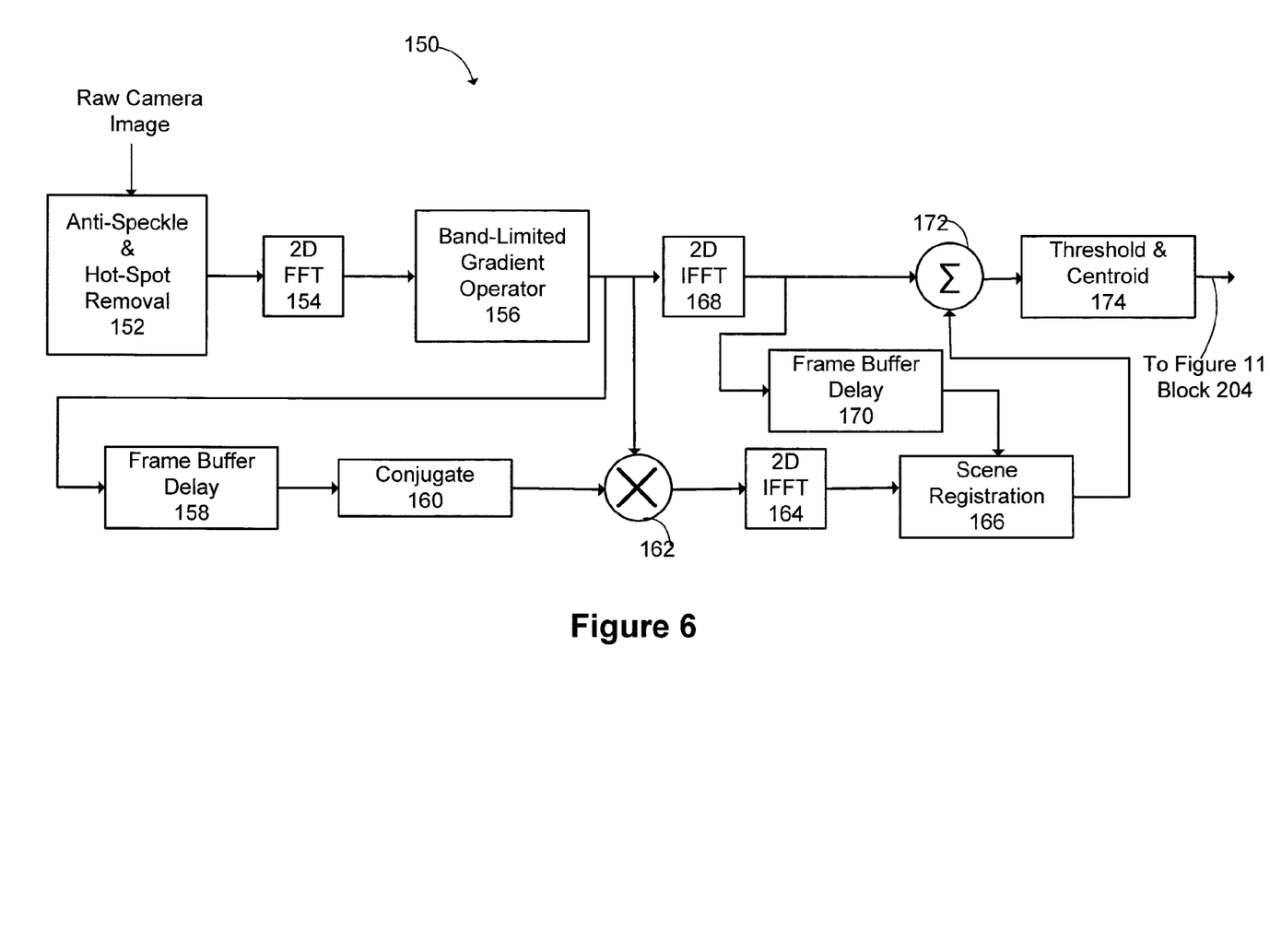
FIG. 6 is an exemplary block diagram of a mortar detection algorithm in accordance with one aspect of the present invention.
Figure 7:
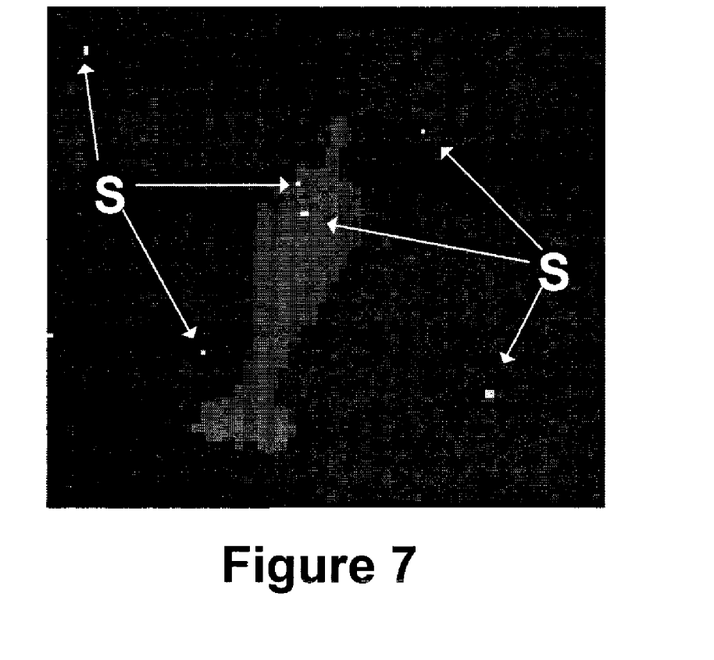
FIGS. 7-10 are exemplary illustrations of mortar shell data being processed in accordance with aspects of the present invention.

Referring to FIG. 6, a block diagram of signal flow associated with a mortar and artillery detection algorithm 150 is illustrated. Data from the detector 30 is input into block 152, which removes speckle and hot-spots detected in the data. Generally, the data is in the form of raw image and input into block 152. One of ordinary skill in the art will readily appreciate that the image may be a raw image and/or include some processing of the image prior to entry into the block 152. FIG. 7 is an exemplary illustration of an airborne target that has been processed according to block 152. Note: the degree of lightness of areas near the tail, which generates the most heat on the target. The speckles (S) are evident throughout the image.

At block 152, the data is filtered to remove or attenuate values that are above and/or below a threshold. Such values may be caused by sensor speckle noise and/or hot spots in the detected image. For example, data that is above the average intensity of the image may be clipped and/or attenuated.

At block 154, a fast Fourier transform is performed on the filtered data, which converts the data from the spatial domain to a frequency domain.

Figure 8:
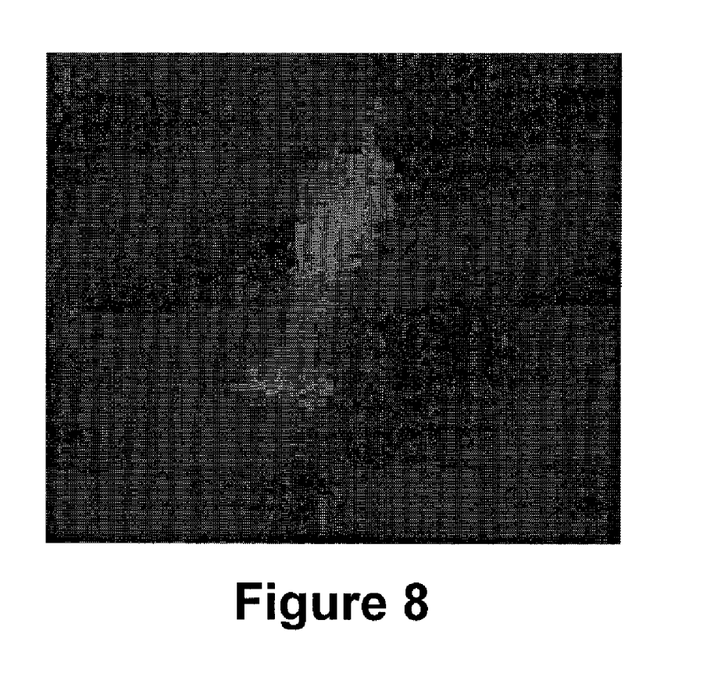

At block 156, a band-limited gradient operation is performed on the data. The band-limited gradient operation removes the low frequencies and high frequencies detect the in the image, so that a predetermined band of frequencies are used to determine the edges. The allowed band of frequencies may be configured based automatically by image analysis techniques and/or set manually. In one embodiment, a low threshold may be set and a high threshold value may be set, such that data values below the low threshold and data values above the high threshold may be filtered out of the image. The output of the band-limited gradient operation 156 is output to three blocks, blocks 158, 162 and 168. FIG. 8 is an exemplary illustration of the data after processing by block 168, which is shown as being converted to the image domain for illustrative purposes only. Note that area of contrasting intensity has been removed (as compared to FIG. 7) and the object appears as a soft outline.

At block 158, the output of the band-limited gradient operation 156 is input into a frame delay buffer. The frame delay buffer 158 compares the previous image data with the next image to determine how far the target moved between images by using a correlation process. One of ordinary skill in the art will readily appreciate that a variety of correlation functions may be used in accordance with aspects of the present invention.

Figure 9:
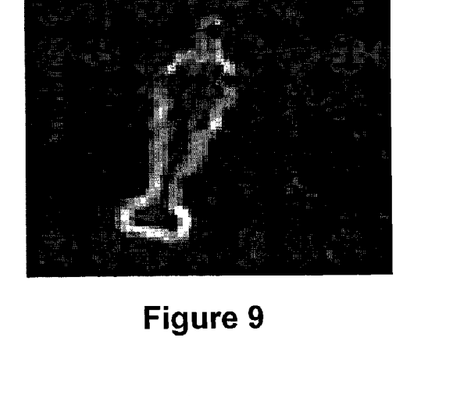

At block 160, the complex conjugate of the Fast Fourier Transform (FFT) of the received image is calculated. The conjugate is output to the logical multiplier 162 (e.g., convolution operator), which multiplies the band-limited gradient operator data output from block 156 with the conjugate output from block 160. Thus, the logical multiplier 162 essentially multiplies the present image with its conjugate. An inverse FFT is applied to the resulting product, which converts the frequency data to spatial data (e.g., a 2-dimensional image), at block 164. The output of block 164 is an image that illustrates bright spot relative shift in position between the delayed image and the new image, as shown in FIG. 9.

One input to block 166 includes information on the shift in position of the present image. The other input to block 166 is an input from a frame delay buffer at block 170. Block 170 receives input from block 168, which is an inverse FFT applied to the band-limited gradient operator data output from block 156 to convert the frequency data to spatial data, at block 168. The output of block 168 is routed to a frame delay buffer 170 and separately to a logical summer 172.

Figure 10:
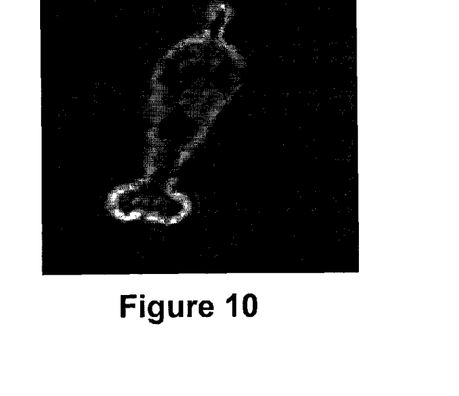

At block 166, the scene registration block determines the shift in position of bright objects in the data. The output of block 116 is summed with the output at block 168 at the logical summer 172. This step establishes a reinforced image that is able to account for a noisy image due to environment and/or other conditions, as illustrated in FIG. 10. This delay/ reinforce method can include one or several delayed frames shifted to reinforce the current image.

At block 174, the output of the logical summer 172 is input to block 174, wherein the resulting image may be subjected to further manipulations, such as threshold (e.g., binarizing) and feature extraction such as centroid calculations. The output of block 174 is used for target positioning measurements and input into the mortar tracking algorithm discussed below. As used herein, "threshold" refers discarding and/or deleting image values above and/or a below a certain value. The value is referred to the threshold value.

Figure 11:
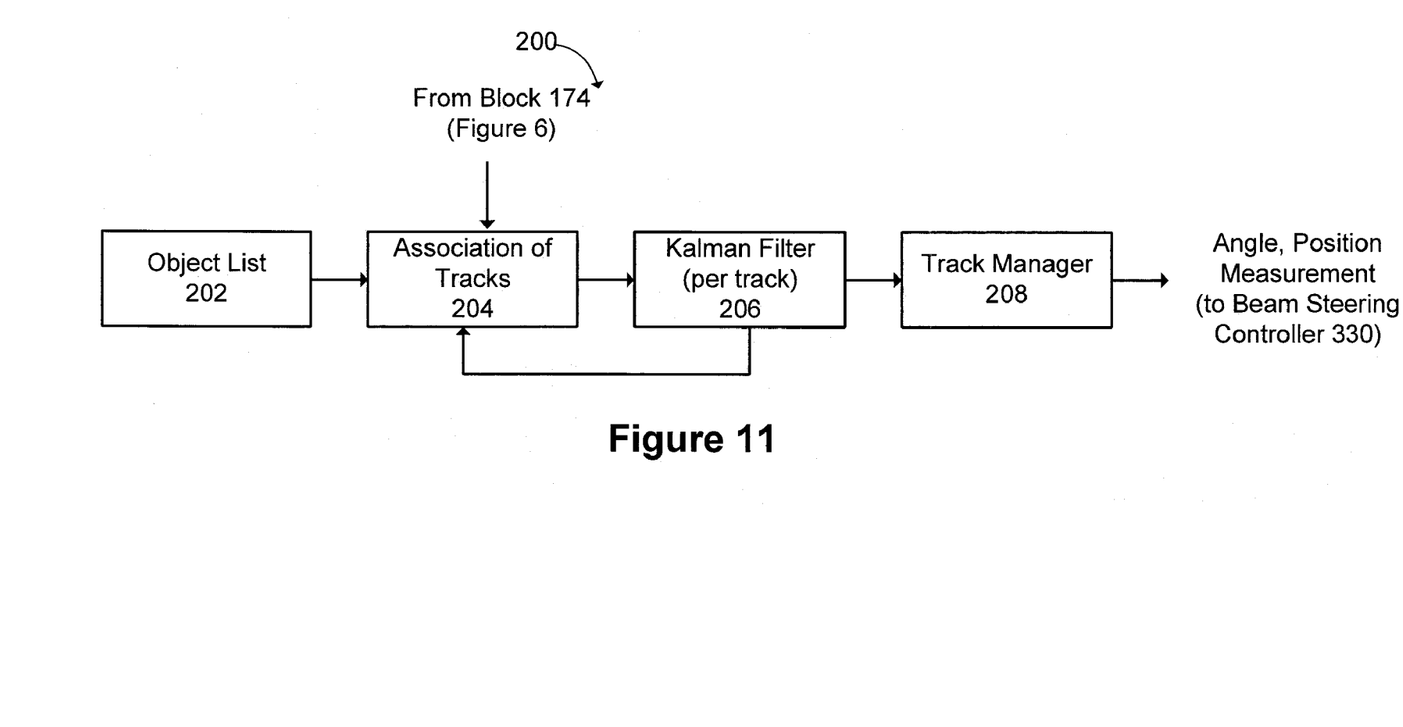
FIG. 11 is an exemplary block diagram of a mortar tracking algorithm in accordance with one aspect of the present invention.

Referring to FIG. 11, a block diagram of an exemplary mortar tracker algorithm 200 is illustrated. The algorithm 200 receives the output of block 174 from the mortar detection algorithm 150 as an input at block 204. The output of block 174 is in the form of a centroid, which is compared to the position state of existing tracks stored in object list (block 202). If an existing track associates with the measurement, that track is updated through Kalman filter 206. If the association fails, a new track is established. The Kalman filter 206 provides an efficient computational (recursive) mechanism to estimate the state of a process, in a way that minimizes the mean of the squared error. A Kalman filter supports estimations of past, present, and future states. In this particular case, the Kalman filter maintains the best estimate of track object attributes (e.g., position, velocity, size, etc.) for each detected object. For example, the Kalman filter may determine that the size of a target is increasing, which generally means that the target is coming closer to the detection system.

The Kalman filter is recursive in that the state returns to block 202, determine which objects are maximally likely represent establish tracks. When recursive process is complete and/or an object and/or track has been identified the Kalman filter outputs the results to the track manager at block 208.

The track manager 208 determines if new tracks are to be spawned, stale tracks should be pruned and selection of the track of maximally likelihood to be the target. For example, if the track manager is unable to associate any tracks with a known object (e.g., the object has the wrong speed and/or shape), a new track may be spawned to track the object. If a previously identified track has object attributes that no longer match other known objects, the track may be deemed stale and pruned (e.g., no longer monitored). When the track is identified as likely to be the target, the tracks angle, position and measurement information is provided to the HEL steering controller function block 330, as discussed below.

The processes discussed above are generally applicable to mortar and artillery targets. One method to destruct mortars is generally to illuminate a spot on the mortar case that heats the exterior and conductive heat transfers to the explosive filler of the mortar causing a low grade deflagration that ruptures the case rendering the mortar inert. Such a method is generally not applicable to unmanned aerial vehicles (UAVs) and missiles. In a UAV, the above methods may cut a small hole near the center of the UAV. Such a hole may not disable the UAV and the UAV could remain a threat (e.g., the cutting of a small hole would not guarantee disablement or destruction of the UAV. One method of destroying a UAV is to cut a wing off of the UAV. In order to accomplish this task, the aimpoint generally must be offset to a vulnerable portion of the target. Therefore, the center of the image and at least one offset point is generally needed to be tracked. This generally requires the attitude of the target to be tracked (e.g., bank angle, yaw angle, roll angle, pitch angle, etc.).

Figure 12:
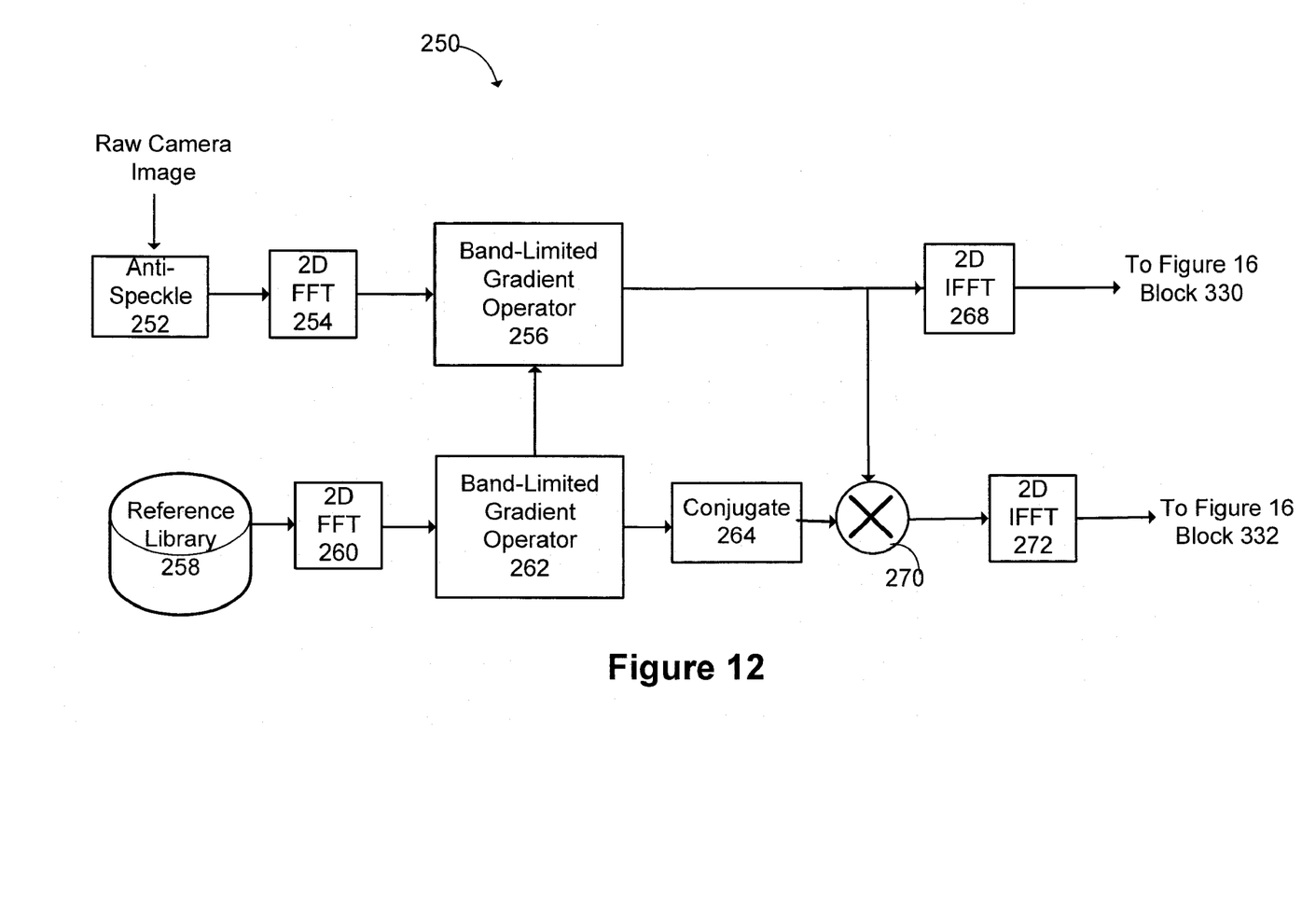
FIG. 12 is an exemplary block diagram of a unmanned aerial vehicle and target pose detection algorithm in accordance with one aspect of the present invention.

Referring to FIG. 12 an exemplary method 250 for targeting an intended target is illustrated. At block 252, data from the detector 30 is received. Block 252 removes speckle detected in the data. Generally, the data is in the form of raw image and input into block 252. One of ordinary skill in the art will readily appreciate that the image may be a raw image and/or include some processing of the image prior to entry into the block 252. At block 252, the data is filtered to remove or attenuate values that are above and/or below a threshold value. Such values may be caused by sensor speckle and/or hot spots in the detected image. For example, data that is above and/or below the average intensity of the image may be clipped and/or attenuated.

At block 254, a fast Fourier transform is performed on the filtered data, which converts the data from the spatial domain to a frequency domain.

At block 256, a band-limited gradient operation is performed on the data. The band-limited gradient operation removes the low frequencies and high frequencies detected in the image, so that a predetermined band of frequencies are used to determine the edges. The band-limited gradient operation at block 206 is the same as the operation discussed above with respect to block 156.

The band-limited gradient operation block 256 also receives band-limited gradient data from a reference library of UAVs. The reference library of UAVs is provided at block 258. The reference library includes all pertinent information necessary to track a desired UAV target. For example, the reference library includes images of each target to be tracked at a plurality of attitudes along with one or more offset points to identify one or more vulnerable points of the target. The vulnerable points may be stored in any desired manner. For example, the reference library may include target centered coordinates that may be used to offset the aimpoint.

At block 260, a fast Fourier transform is performed on one or more reference objects from the reference library, which converts the data associated with targets in the reference library from the spatial domain to a frequency domain.

At block 262, a band-limited gradient operation is performed on the data from the reference library. The band-limited gradient operation removes the low frequencies and high frequencies detected in the image, so that a predetermined band of frequencies are used to determine the edges. The output of the band-limited gradient operation 262 is output to block 256 and block 264. The band-limited gradient operation at block 262 is the same as the operation discussed above with respect to blocks 156 and 256.

The band-limited gradient operator 256 combines the image data with the reference library data and routes combined image data to block 268 and block 270.

At block 268, an inverse FFT is applied to the filtered data, which converts the frequency data to spatial data (e.g., a 2-dimensional image correlation surface) for use by the beam steering architecture, as discussed below. The image output at block 268 is a band-limited, edge detected image, which may be similar to FIGS. 9 and/or 10, as discussed above with regard to a mortar target.

At block 264, the complex conjugate of the band-limited data associated with the reference image is calculated.

At block 270, a convolution operation is performed on the complex conjugate of the band-limited data with the combined band-limited data from the present image and the band-limited data associated with the reference image.

Figure 13:
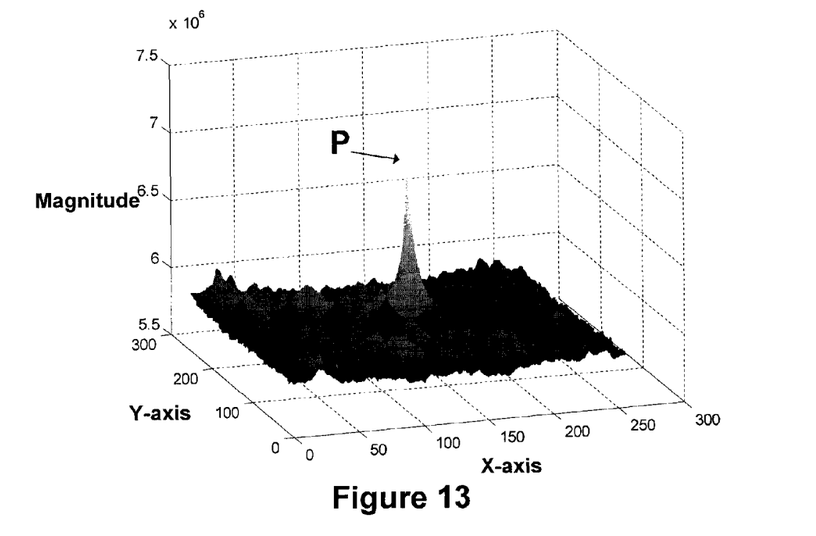
FIG. 13 is an exemplary correlation surface associated with an exemplary target in accordance with aspects of the present invention.

At block 272, an inverse FFT is applied the output of the convolution operation to obtain a correlation surface, which indicates scoring criteria for pose detection, peak position localization of center of gravity of the target, etc. The output of block 272 is a correlation surface, which is output for use by the beam steering architecture, as discussed below. An exemplary correlation surface is shown in FIG. 13. The magnitude of the correlation surface (indicated by peak (P) indicates a score for pose detection and peak position localizes the center of gravity of the target.

This process is run for each candidate image from the library and the highest scoring candidate defines the target attitude. The position of the peak of the correlation surface defines the two dimensional position of the target.

Figure 14A:
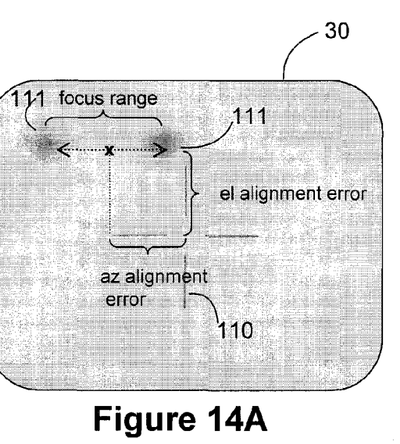
FIGS. 14A-14D illustrate one or more principles of operation of the beam director subsystem in accordance with aspects of the present invention.

The principle of operation of the beam director subsystem 12 is discussed referring to FIGS. 14A-14D. The bore sight 110 depicted in the images may correspond to the center of the detector 30. Referring to FIG. 14A, the centroid of the object pair, which corresponds to the first and second portions 111 of the HEL beam, is denoted with the reference "x" indicates bore sight error between the HEL beam 18 and the track detector 30. The error is given in terms of elevation (el) alignment error and azimuth (az) alignment error. The object separation (less=longer) indicates focus range. The processor generally calculates a centroid (which corresponds to the "x" reference in FIG. 14A) corresponding a HEL position (x) that corresponds to an equidistant point located between the first portion 111 of the HEL beam and the second portion 111 of the HEL beam received by the detector 30. For example, the processor determines a number of pixels that the HEL position is offset from the center point of the detector to determine HEL beam misalignment. In one embodiment, processor also determines an angle of divergence between the first portion of the HEL beam and the second portion of the HEL beam.

Figure 14B:
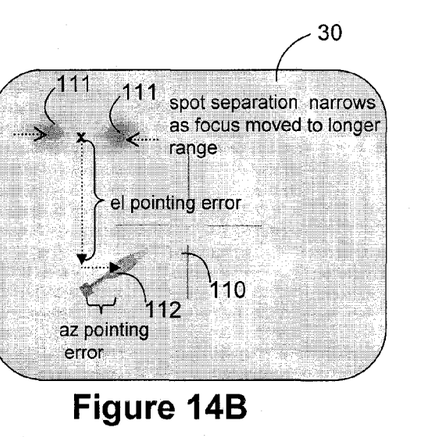

Referring to FIG. 14B, a target 112 enters the field. The weapon system places the target in field of view of detector 30; provides range measurement to adjust focus of the primary and secondary mirrors; and the processor measures the information received at the detector to achieve focus range and adjust accordingly. For example, the portion of the tracking beam received by the detector and a centroid is calculated. The processor then calculates a number of pixels that the centroid is offset from a center point of the detector 30 to determine tracking beam misalignment.

Figure 14C:
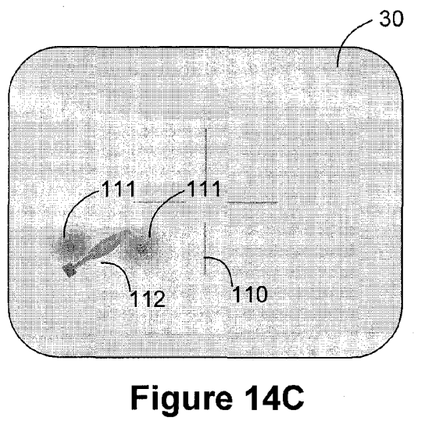
Figure 14D:
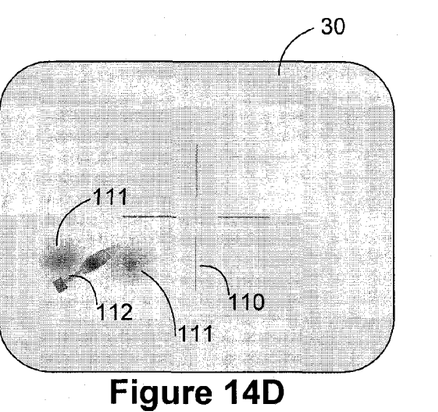

With this information, the processor calculates target and measures bore sight error. Referring to FIG. 14C, the processor generates a control signal to steer the HEL beam to the airborne target based upon the determined relationship. For example, a guidance filter directs fast steering mirror 44 to steer HEL beam 18 to target position. Referring to FIG. 14D, the target is engaged with the HEL beam 18.

Figure 15:
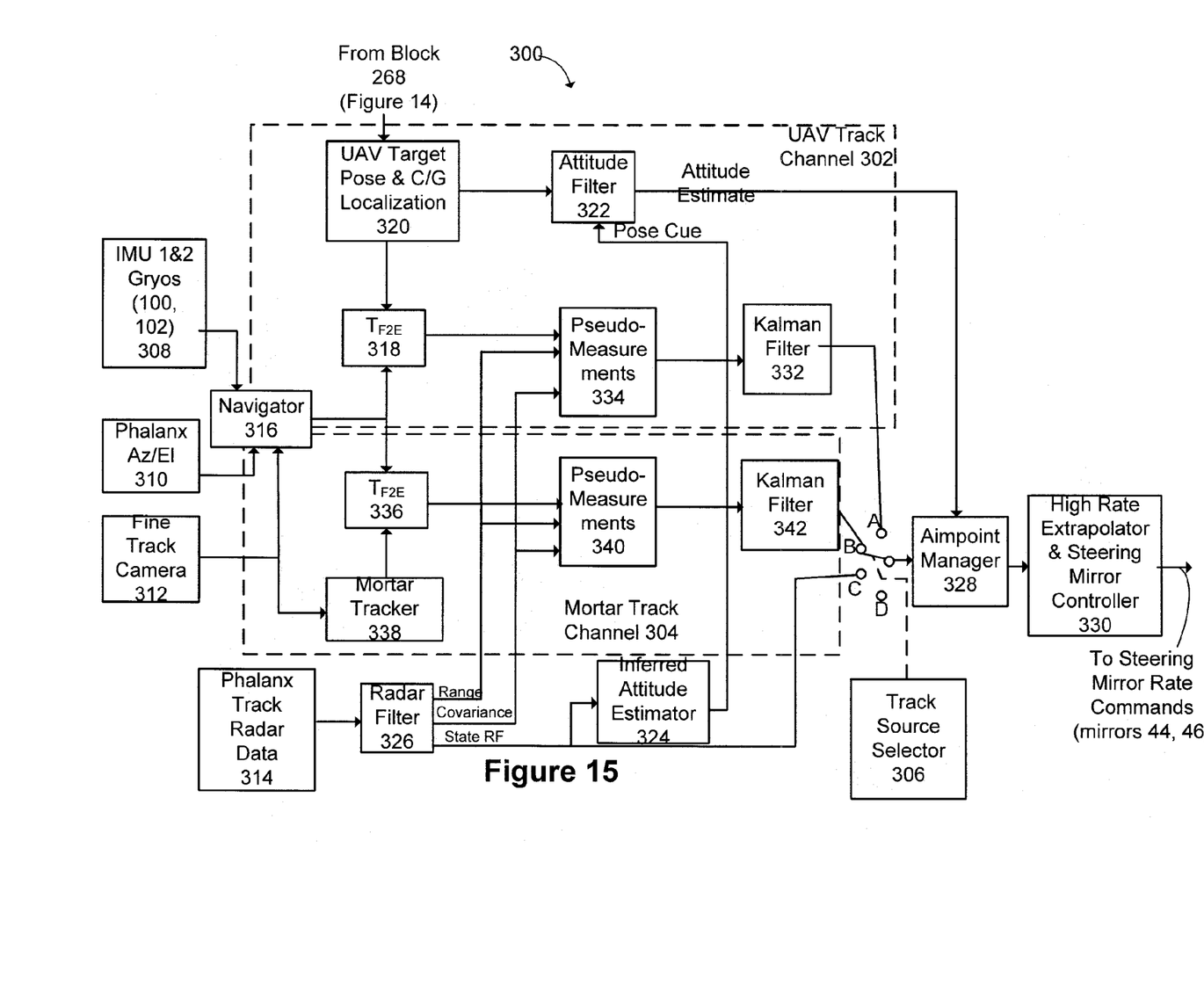
FIG. 15 is a HEL beam steering architecture in accordance with aspects of the present invention.

Referring to FIG. 15, an exemplary beam steering architecture 300 is illustrated. The beam steering architecture may include a UAV track channel 302 and a mortar track channel 304, identified in dashed lines. A track source selector 306 is used to determine, which channel is active. For example, when selector 306 is in position "A", the UAV track channel is operative. When the selector 306 is in position "B", the mortar track channel is operative, when the selector is in position "C", neither the UAV track channel nor the mortar track channel is operative. When the selector is in position "C" track radar data from the Phalanx Gun System is operative. When the selector 306 is in position "D", the selector is not operative. The track source may be manually controlled and/or controlled by a processor.

The following parameters may be input to the beam steering architecture: inertial measurement units output from gyroscope triads 100, 102 (e.g., IMU 1&2 Gyros) 308, inputs relating to azimuth and elevation 310 from a host platform (e.g., a Phalanx Gun system manufactured by Raytheon or another weapon platform), track camera information 312, and track radar data 314. One of ordinary skill in the art will readily appreciate that the above inputs are exemplary in nature and that a beam steering architecture may receive additional inputs and/or a different combination of inputs than described.

The gyroscope information 308 and azimuth/elevation information 310 is input to a navigator 316. The navigator 316 uses this information to determine where the HEL is pointing in three-dimensional space. The navigator 316 may be a Kalman filter that estimates gyroscope bias, for example.

The following description of the beam steering algorithm will assume that the track source selector is in position "A". The output from the navigator 316 is input to the $T_{F2E}$ block 318, which transforms coordinates from the focal plane of the camera to earth-centered coordinate system. The output from the navigator 316 is also received at block 320 for a determination of the UAV target pose detection and center of gravity localization. The output of block 268 from FIG. 12 is also received by block 320. Block 320 determines the target pose detection and center of gravity localization of the UAV, as explained above with respect to FIG. 12. The output of block 320 is transferred to attitude filter block 322 and to $T_{F2E}$ block 218.

The attitude filter block 322 receives input from block 320 that corresponds to the UAV target pose detection and center of gravity localization block 324. Block 324 corresponds to the inferred attitude estimator. The inferred attitude estimator receives state information from the radar filter, at block 326. The radar data information includes X, Y, Z position, velocity and acceleration estimates derived from the radar data, at block 314. In block 326, range from radar data block 326 is combined with two angles from a camera to obtain a pseudo-measurement (not a direct measurement in free space, but a combination of a 2D measurement and a 1D measurement which yields a pseudo X, Y, Z measurement that is used to update the Kalman filter 332.

The inferred attitude estimator 324 estimates a velocity and acceleration from the position. From this estimation, attitude information associated with the target may be inferred, assuming the target is a winged aircraft-type target. For example, if a target flying straight and level with no acceleration and constant velocity and not turning, an inference may be made that the wings will be level. This inference is used to reduce the amount of searching in the attitude filter in the pose detection portion. That is, an exhaustive search of every possible combination of yaw, pitch and roll does not have to be search, which reduces the number of possible combinations of yaw, pitch, and roll combination in the library. Since it is known that, in this example, there is no acceleration; only pose coordinates between +/−10 degrees need to be searched to final a valid pose estimate.

Based on the information provided from block 326 and 324, the attitude filter 322 outputs an attitude estimate to the aimpoint manager 328. The aimpoint manager 328 also receives state information from a Kalman filter 332. The Kalman filter 332 is a nine state filter that provides updates of three dimensional state variables associated with position, velocity and acceleration associated with the target. The Kalman filter 332 receives input from pseudo-measurement block 334. The pseudo-measurement block 334 receives inputs from the $T_{F2E}$ block 318, which transforms coordinates from the focal plane of the camera to earth-centered coordinate system range and covariance data from the radar filter 326. Based on these inputs center of gravity state estimates are made. This information may be updated at predetermined times, based on every new image or any other desired manner to effectively track a UAV target.

Now operation of the beam steering architecture will be described in connection with the mortar track channel 304. As set forth above, the mortar track channel 304 is operative when the track source selector is in position "B", as illustrated in FIG. 15.

The output from the navigator 316 is input to the $T_{F2E}$ block 336. The output from the navigator 316 is also received at block 338, which corresponds to the mortar tracking algorithm discussed above in connection with Block 208 of FIG. 11. The output of the mortar tracking algorithm block 338 is received by $T_{F2E}$ block 336. The $T_{F2E}$ block 336, which receives information from the navigator block 316 and the mortar track block 338, which transforms coordinates from the focal plane of the camera to earth-centered coordinate system.

The output of the $T_{F2E}$ block 336 is received by the pseudo-measurements block 340 along with range and covariance data provided by the radar filter block 326. The pseudo-measurement block 340 receives inputs from the $T_{F2E}$ block 336, which transforms coordinates from the focal plane of the camera to earth-centered coordinate system range and covariance data from the radar filter 326. Based on these inputs center of gravity state estimates are made. This information may be updated at predetermined times, based on every new image or any other desired manner to effectively track a mortar target.

The updated information is sent to the Kalman filter block 342. The output of the Kalman filter block 342 is made available to the aimpoint manager block 328, which determines where to steer the HEL 18 and transfers the coordinates to steering controller block 330 for use by the high rate extrapolator and steering mirror controller, which is also referred to herein as the "HEL Steering Controller", "Beam Steering Controller" and/or "steering controller". The high rate extrapolator and steering mirror controller block 330 functions to output the steering mirror rate commands to control steering of the HEL 18 by providing control signals to mirrors 38, 40. The steering controller function block 330 is operatively coupled to the processor. The steering controller function block 330 may be a component of the processor 20 (e.g., a component of the computer system), as illustrated in block 36 of FIG. 2 or may be remotely located from the processor 34.

This application incorporates by reference, as if fully re-written herein, patent applications entitled "A High Energy Laser Beam Director System and Method" and A Method and System of Aligning a Track Beam and a High Energy Laser Beam", each of which are common owned by the assignee of the present application and were filed on the same date as the subject application.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A tracking system for use with a high energy laser, the system comprising:
   an illuminator for generating electromagnetic radiation to be directed at an airborne target;
   a track telescope having a track detector configured to receive electromagnetic radiation reflected from the airborne target;
   a track source selector for selecting a type of airborne target to track, wherein the selector is operable in a first setting when the airborne target is a mortar shell and operative in a second setting when the airborne target is an unmanned aerial vehicle (UAV);
   a processor coupled to the track detector, the track source selector and a steering controller of a high energy laser (HEL), wherein the processor processes target information based at least in part on the received electromagnetic radiation detected from the track detector by applying a band-limited edge detection operation to the target information and generates band-limited edge detection data used to identify edges of the airborne target in order to track the airborne object.

2. The tracking system of claim 1, wherein the illuminator is at least one selected from a group consisting of a solid-state laser, a fiber laser or a laser diode array, wherein the illuminator has an output beam that is directed to a target through either free-space coupled or fiber-coupled delivery.

3. The tracking system of claim 2, wherein the illuminator outputs the electromagnetic radiation in an electromagnetic spectrum range between visible and infrared.

4. The tracking system of claim 1, wherein the track detector is a camera operable to detect the electromagnetic radiation reflected from the airborne target.

5. The tracking system of claim 1, wherein further including a storage element coupled to the processor, wherein the storage element stores reference target information associated with one or more airborne targets.

6. The tracking system of claim 5, wherein the reference target information is stored in a database of reference objects that may be used to predict the attitude of the target.

7. The tracking system of claim 6, wherein the database includes a plurality of airborne targets and track information associated with each of the plurality of airborne targets.

8. The tracking system of claim 6, wherein at least one reference object is in the form of a silhouette.

9. The tracking system of claim 1, wherein the processor utilizes the type of airborne target selected to track the airborne object.

10. The tracking system of claim 9, wherein the track selector is manually selected.

11. The tracking system of claim 9, wherein the track selector is controlled by the processor.

12. A method for tracking an airborne target, the method comprising:
    generating electromagnetic radiation to be directed at an airborne target;
    receiving electromagnetic radiation reflected from the airborne target with a track detector;
    selecting a type of airborne target to track, wherein the selector is operable in a first setting when the airborne target is a mortar shell and operative in a second setting when the airborne target is an unmanned aerial vehicle (UAV);
    processing the received electromagnetic radiation to generate a control signal to control a steering controller used to direct a high energy laser (HEL), wherein the received electromagnetic radiation detected is processed by applying a band-limited edge detection operation to target information based at least in part on the received electromagnetic radiation to generate band-limited edge detection data used to identify edges of the airborne target in order to track the airborne object.

13. The method of claim 12, wherein the electromagnetic radiation is produced by at least one of a solid-state laser, a fiber laser, or a laser diode array, wherein an output beam formed from the electromagnetic radiation is directed to a target through either free-space coupled or fiber-coupled delivery and the electromagnetic spectrum range is between visible and infrared.

14. The method of claim 12, wherein the step of receiving the electromagnetic radiation is performed by a camera operable to detect the electromagnetic radiation reflected from the airborne target.

15. The method of claim 14, wherein the camera generates a target image of the detected electromagnetic radiation.

16. The method of claim 15, the target image is converted from a spatial domain to a frequency domain and the band-limited edge detection operation is performed on the target information in the frequency domain.

17. The method of claim 16, wherein the band-limited edge detection operation removes frequencies between a low threshold value and above a high threshold value of the band-limited edge detection data.

18. The method of claim 12 further including comparing a first target image acquired by the track detector with a second target image acquired by the track detector to determine movement of the airborne target in a period of time between the first target image and the second target image.

19. The method of claim 18 further including calculating a centroid associated with the airborne target from information derived from the first target image and the second target image.

20. The method of claim 18 further including calculating a centroid associated with the airborne target from information derived from band-limited edge detection data associated with the first target image and the second target image.

21. The method of claim 18 further including comparing target information associated with the received electromagnetic radiation with an object list that includes one or more airborne targets stored in a storage element coupled to the processor, wherein the object list is stored in a database of reference objects that may be used to predict an attitude and/or shape of the airborne target.

22. The method of claim 12, wherein the processor utilizes the type of airborne target selected to track the airborne object.

23. The method of claim 22, further including manually selecting the type of airborne target to track.

24. The method of claim 22, further including the processor selecting the type of airborne target to track.

25. A method for tracking an airborne target, the method comprising:
generating electromagnetic radiation to be directed at an airborne target;
receiving electromagnetic radiation reflected from the airborne target with a track detector;
selecting a type of airborne target to track, wherein the selector is operable in a first setting when the airborne target is a mortar shell and operative in a second setting when the airborne target is an unmanned aerial vehicle (UAV);
processing the received electromagnetic radiation to generate a control signal to control a steering controller used to direct a high energy laser (HEL), wherein the received electromagnetic radiation detected is processed by applying a band-limited edge detection operation to target information based at least in part on the received electromagnetic radiation to generate band-limited edge detection data used to identify edges of the airborne target;
processing one or more reference images stored in a storage element coupled to the processor by applying a band-limited edge detection operation to the one or more reference images;
determining an offset value for aiming a high energy laser (HEL) based on the offset value; and
providing the offset value to a steering controller coupled to the processor for steering the HEL.

26. The method of claim 25, wherein the electromagnetic radiation is produced by at least one of a solid-state laser, a fiber laser, or a laser diode array, wherein an output beam formed from the electromagnetic radiation is directed to a target through either free-space coupled or fiber-coupled delivery and the electromagnetic spectrum range is between visible and infrared.

27. The method of claim 25, wherein the step of receiving the electromagnetic radiation is performed by a camera operable to detect the electromagnetic radiation reflected from the airborne target.

28. The method of claim 27, wherein the camera generates a target image of the detected electromagnetic radiation.

29. The method of claim 28, the target image is converted from a spatial domain to a frequency domain and the band-limited edge detection operation is performed on the target information in the frequency domain.

30. The method of claim 29, wherein the band-limited edge detection operation removes frequencies between a low threshold value and above a high threshold value of the band-limited edge detection data.

31. The method of claim 25, wherein the processor utilizes the type of airborne target selected to track the airborne object.

32. The method of claim 31, further including manually selecting the type of airborne target to track.

33. The method of claim 31, further including the processor selecting the type of airborne target to track.

34. A high energy laser (HEL) tracking system comprising:
an illuminator for generating electromagnetic radiation to be directed at an airborne target;
a track telescope having a track detector configured to receive electromagnetic radiation reflected from the airborne target, wherein the track detector is configured to detect the electromagnetic radiation reflected from the airborne target;
a track source selector for selecting a type of airborne target to track, wherein the selector is operable in a first setting when the airborne target is a mortar shell and operative in a second setting when the airborne target is an unmanned aerial vehicle (UAV);
a processor coupled to the track detector and a steering controller of a high energy laser (HEL), wherein the processor processes target information based at least in part on the received electromagnetic radiation detected from the track detector by applying a band-limited edge detection operation to the target information and generates band-limited edge detection data used to identify edges of the airborne target in order to track the mortar shell or the UAV.

35. The HEL tracking system of claim 34, wherein the processor utilizes the type of airborne target selected to track the airborne object.

36. The HEL tracking system of claim 35, wherein the track selector is manually selected.

37. The HEL tracking system of claim 35, wherein the track selector is controlled by the processor.

* * * * *